United States Patent [19]

Tally et al.

[11] 3,767,500

[45] Oct. 23, 1973

[54] METHOD OF LAMINATING LONG STRIPS OF VARIOUS MATERIALS

[75] Inventors: Sidney K. Tally, Nashua, N.H.;
Victor F. Dahlgren, Chelmsford, Mass.

[73] Assignee: TME Corporation, Salem, N.H.

[22] Filed: Dec. 28, 1971

[21] Appl. No.: 213,099

[52] U.S. Cl. .................... 156/184, 156/83, 156/309, 156/323, 161/189, 161/218
[51] Int. Cl. .............................................. B31c 1/00
[58] Field of Search ....................... 156/184, 323, 86, 156/83, 247, 306, 494, 499, 289; 206/159 C

[56] References Cited
UNITED STATES PATENTS

| | | | |
|---|---|---|---|
| 3,094,453 | 6/1963 | Scherer............................ | 156/323 X |
| 3,432,373 | 3/1969 | McMahon.......................... | 156/184 |
| 3,279,333 | 10/1966 | Blair et al. ....................... | 156/86 X |

Primary Examiner—Alfred L. Leavitt
Assistant Examiner—David A. Simmons
Attorney—Granville M. Brumbaugh et al.

[57] ABSTRACT

Laminates of plastic films to metals or to plastic films or of metals to metals joined together by thermal-activated bonding materials are made by winding long strips of the laminate materials in face-to-face and interleaved relation onto a core to form a roll, confining the outside of the roll to prevent it from unwinding and heating the roll to a temperature sufficient to activate the bonding material. The heating of the roll results in a differential thermal expansion of the core, the laminate materials and the roll-confining member that generates a bonding pressure. Various interleaf layers wound between layers of the laminate materials can be used to provide desired laminating pressures during the heating step.

10 Claims, 1 Drawing Figure

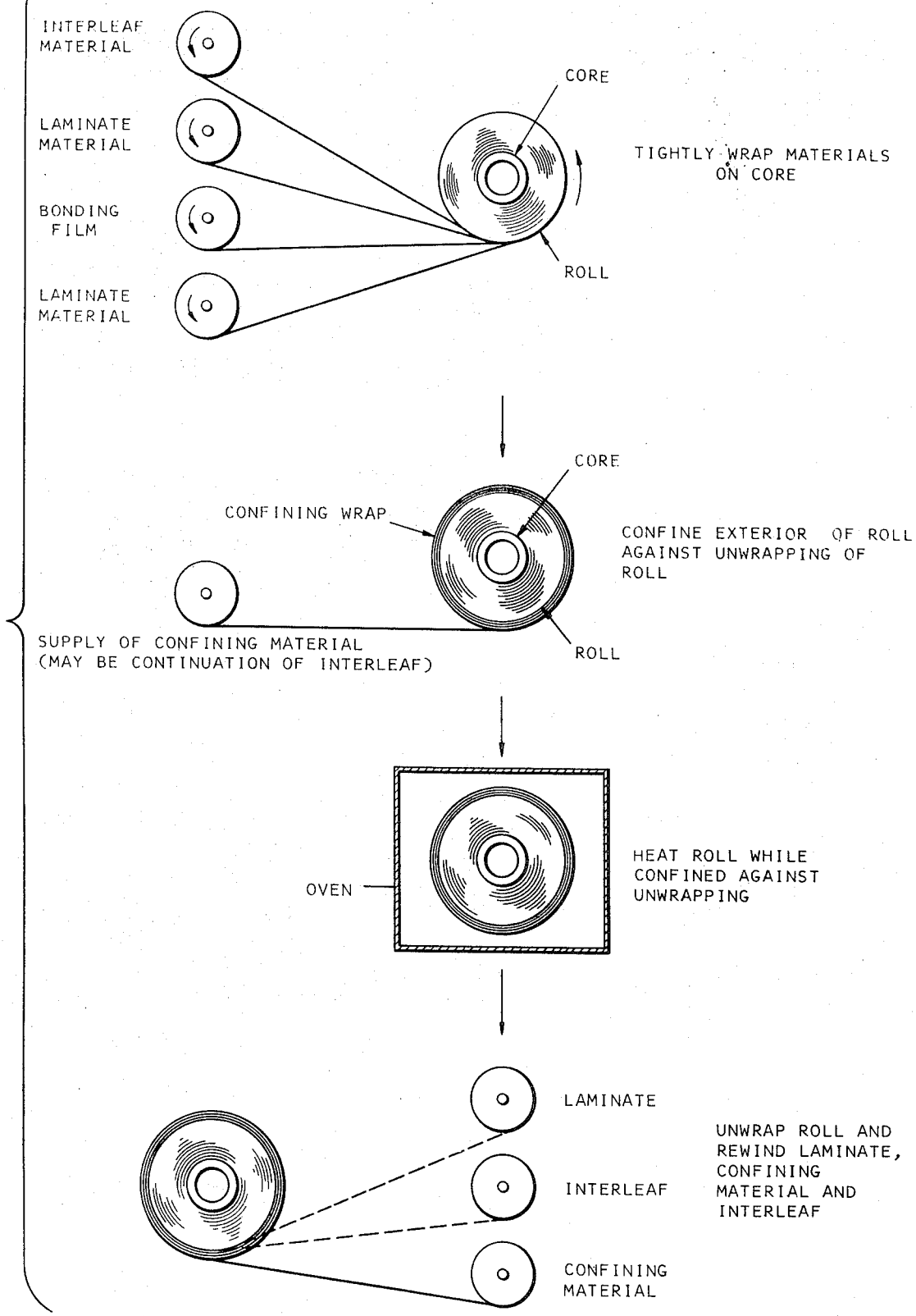

METHOD OF LAMINATING LONG STRIPS OF VARIOUS MATERIALS

BACKGROUND OF THE INVENTION

This invention relates to the manufacture of sheet or strip laminates of plastics to plastics, metals to metals and plastics to plastics.

Although some sheet or strip materials can be laminated using conventional adhesives by conducting the materials through a pressure nip, the properties of many laminate materials and bonding materials require holding the laminate and bonding materials together under substantial pressure at an elevated temperature for substantial periods of time in heated platen presses. The resulting products are necessarily in sheet form and of limited size, and the manufacturing operations involved require elaborate, large, expensive equipment and provide a limited rate of output. Each sheet of the laminate is made individually and may have to be held in the heated press for as much as an hour or more. The disadvantages of such a process are manifest.

SUMMARY OF THE INVENTION

There is provided, in accordance with this invention, a method of laminating two or more elongated strips, say up to 200 ft. or more in length, that permits volume production of laminates with relatively simple equipment and enables long, and indeed continuous (for all practical purposes), strips of the laminates to be produced. The method involves achieving a bonding between the laminate materials by thermal activation of a bonding material (or materials) while maintaining the materials under pressure engagement with each other.

More particularly, the method of the invention comprises the steps of (1) tightly winding long strips of the materials of the laminate in face-to-face and interleaved relation onto a core to form a roll, (2) confining the exterior of the roll to keep the roll from unwinding, and (3) heating the roll to a temperature sufficiently high to activate the bonding material for a time sufficient to form a bond between the strips. The material of the strips, the bonding material, the core and the confining member that keeps the roll wound are selected to provide a differential between the degrees of thermal expansion of the various parts of the roll that generates a substantial pressure engagement between the layers that make up the roll. Desired bond-forming pressures between the laminate materials may be attained by winding between the layers of the laminate sandwich wound on the roll various interleaf materials that generate pressure, absorb pressure or control pressure distribution across a cross section of the roll. A release strip may also be interleaved between the layers of the laminate sandwich to prevent an unwanted bond between the inter-leaf materials and the laminate materials.

As used herein, the term "laminate materials" is used to refer to the materials, including the bonding material, that make up the final laminate product. It may be mentioned at this point that the bonding material may actually be a plastic film with bonding properties that forms one primary layer of the laminate product. The term "interleaf material" refers generally to any material wound on the roll between successive layers of the laminate materials but not united or bonded by the process and, therefore, not part of the laminate product. The interleaf materials include: (1) "pressure-distributing strips," strong materials with relatively low coefficients of thermal expansion that provide pressure distribution across the cross section of the roll by tending mechanically to isolate successive layers of the roll from each other, generally by constraining outward expansion of each layer; (2) "cushioning strips," materials which absorb pressure generated by thermal expansion of the other materials of the roll; (3) "pressure-generating strips," materials which generate pressure by thermal expansion and supplement the bonding pressure generated by differential thermal expansion of other materials of the roll; and (4) "release strips," materials which prevent unwanted bonding of the laminate materials in successive layers of the roll to each other or of the laminate materials to the interleaf materials. In some instances, an interleaf material may serve more than one purpose in the roll.

The method of the invention can be used to make a wide variety of laminates from various primary layer materials and bonding layer materials in sandwiches of two, three or more primary layers and corresponding bonding layers. Some laminate products made by the method will have only two layers, one of the layers being both a primary laminate layer and a bonding material. Other laminates will have three or more primary laminate layers with one or more bonding materials between each pair of adjacent layers.

DESCRIPTION OF THE DRAWING

For a better understanding of the invention, reference may be made to the following descriptions of the method in greater detail and of some specific examples, considered in conjunction with the accompanying drawings, which is a schematic representation of the method.

DESCRIPTION OF THE INVENTION IN FURTHER DETAIL

The first step in the method of the invention (see top portion of the drawing) is to wind the laminate materials and any interleaf materials onto a core. As mentioned above and discussed further below, the core plays a significant part in the process, inasmuch as it is part of the composite multi-layer roll that expands upon heating to generate a bonding pressure. The core is preferably hollow to allow heating of the roll from inside as well as outside, of strong construction, and made of a material having a moderate coefficient of thermal expansion and good thermal conductivity. Good results with most laminates are obtained with a hollow aluminum roll having an outside diameter of 6 in. and a wall thickness of ¾ in.

The laminate and interleaf materials will generally be supplied from supply rolls, but one or more of the materials may pass through a pretreatment step before being wound on the roll. For example, interleaf materials may be treated with a release agent, and laminate materials may be coated with a liquid or paste adhesive, primer, antioxidant or the like. The requirements in this respect will vary, depending on the particular materials involved.

Each strip of the roll is wound under controlled tension, the supply rolls being braked by appropriate devices. It is usually important for good adhesion to maintain sufficient tension on each strip to ensure that no air is entrapped between layers. In some instances a press roll that forms a pressure nip with the laminate roll can be used to advantage in ensuring exclusion of air and a tight wrap. The tension on any material cannot, of course, exceed the tearing strength of the material, and as a general rule should result in only moderate elongation of the material; excessive elongation can lead to rupture or serious weakening if the forces produced by internal pressure during the heating step should produce substantial additional elongation. Moreover, the pretensioning can lead to warping of the laminate product when it is unwound and the pre-tension force released.

Each strip is preferably started onto the roll by taking it for one or two turns around the roll before bringing in the next strip. The leading ends of the strips should not be radially coincident in any case. These precautions limit high points on the roll, ensure smoothness and restrict over-pressure zones. It may be desirable, alternatively, to notch the core lengthwise to accept the leading ends of the strips so that there will not be one or more high points on the roll. The number of wraps and thus the length of the laminate can vary widely, but it appears now that 200 ft. is a practical limit, from the point of view of pressures, forces, weight, size and other factors. The width of the strips is not critical and appears to be limited only by mechanical factors such as the relation between the weight and size of the roll and the ability of the winding equipment, material handling equipment, ovens, etc. to handle the rolls. For many laminates, a two-foot width is practical to work with and adequate for end use.

After the desired lengths of laminate and interleaf strips have been wound onto the roll, the roll is confined by one or another form of confining member to prevent it from unwrapping. The most practical way of confining the roll is to overwrap it with a number of turns of sheet material. The confining member is, of course, an important part in the bonding pressure system, and the nature and structure of the confining arrangement is, therefore, selected according to the requirements for a particular laminate. For example, when the laminate requires generation of high bonding pressures, a confining member in the form of sufficient wraps of heavily tensioned steel sheet to form a "hoop" of substantial thickness, say ⅛ in., around the roll is appropriate or may be necessary. On the other hand, a low bond pressure can be confined by a few wraps of aluminum, "Teflon" (polytretraflouroethylene), or other sheet material or by fiberglass tape. In some cases it may be desirable loosely to confine the roll to allow for substantial expansion. Mechanical clamps, rather than or in addition to windings of strip or sheet material, can be used. The specific examples below will provide guidance in the selection of the confining member.

The composite roll (core, laminate materials, interleaf materials, and confining member) are then placed in an oven for heating. The oven temperature, and final temperature of the roll, will, of course, vary with the materials involved, and in particular with the bonding medium. It is evident that the method of the invention offers the greatest advantage when used to make laminates in which the bonding material requires maintaining the laminate materials, and especially the bonding material, under pressure engagement at an elevated temperature for a substantial period of time. In general, the bonding materials are, then, of the thermosetting and thermoplastic types which have specific, known setting temperatures, and it is, therefore, the setting temperature of the bonding material that is to be reached and held for long enough to set the bond.

It has been found highly desirable to place the roll in a cool oven and raise the oven temperature gradually, that is, over a period of hours. The idea is to heat the roll through reasonably evenly over a prolonged period. If the roll were placed in an oven already at a high temperature, the innermost and outermost layers would heat rapidly while the intermediate layers would remain cool, thus producing a non-uniform pressure condition across the roll and the likelihood of a bond of widely varying strength from place to place along the length of the laminate. Similarly, it is usually best to bring the roll back down from the bond-setting temperature to room temperature rather slowly. Quenching can harm the bond in many cases by tending to produce over rapid contraction of the heated roll and interlayer tension. On the other end, some properties of some laminates may well be improved by quenching. As with many aspects of the method, the cooling rate is a variable.

After the roll reaches the desired temperature, it should be allowed to soak at that temperature for about 30 minutes to an hour before cooling is begun.

The cooled roll can be unwound, and the components (interleaf materials, laminate, confining wrap material) separately rewound onto rolls. Some interleaf materials can be reused. The laminate, of course, can be further processed as it is unwound; for example, it may be blanked into desired pieces, formed, cut into strips, coated with other materials, printed on, and so forth. Or it can be wound into a roll for storage or shipment.

The primary laminate layers of a laminate made by the process may be selected from among long lists of plastic films, metals, fibrous webs and other flexible sheet materials in strip form. It is only necessary that the materials be capable of withstanding the process conditions (temperature, force due to pressure, wrapping tension, etc.). Those listed in Table I below are exemplary, the list, however, being in no way limiting:

TABLE I

Aluminum
Copper
Steel
Stainless steel
Titanium
Nickel
"Monel"
"Inconel"
Alloys of the above
Various treated Paper-based webs
"Teflon" (polytetraflouroethylene)
"Teflon FEP" (copolymer of tetraflouroethylene and hexaflouropropene)
"Rulon"
Fiberglass
"Tedlar"
Polyethylene
Vinul/Urethane copolymers
"Mylar" (polyethylene terephthalate)
"Kapton"
"Nomex"
"Fluroloy C"
"Fluroloy S"

The interleaf materials may be any materials that can sustain the operating conditions and will be selected, in general, to adjust the bond pressures generated by differential thermal expansion of the other layers and parts of the composite roll. Any of the materials listed in Table I can be used as an interleaf material, but in general the interleaf materials chosen will be those materials that will not form a bond with the layers they are next to into the roll.

The cushion materials will generally have voids, such as the fiber-based materials usually do. Fiberglass cloth provides very good results as a cushion material. Low melting point plastics can be used as cushion materials, since they will extrude out to provide expansion space for other layers, but they are not to be preferred because the extruded residue is hard to handle in processing.

Steel sheet is probably the best pressure-distributing material in view of its relatively low cost, high strength, low coefficient of expansion, and good thermal conductivity; aluminum is a good pressure-distributing material for some laminates, but because it loses much of its strength at high temperatures, and has a coefficient of thermal expansion somewhat higher than steel, it is not especially useful in high temperature, high bond pressure processes.

Many of the plastic films listed in Table I form good bonds with each other and some of the metals and thus can serve as both a primary laminate layer and a bonding medium. "Teflon FEP" is an especially good bonding material, as well as a good primary laminate material. The bonding materials can also be selected from among the many known thermosetting and thermoplastic adhesives and adhesive systems. The epoxies are very useful in the method of the invention, as are the ethylene/acrylic acid adhesives. Some adhesives can be used in sheet form, but many, notably the epoxies, will be used as liquid or paste coatings preapplied to one of the laminate materials.

The discussion above of the materials useful in the process is intended to be merely indicative of the broad range involved, and those skilled in the art will doubtless to able readily to adopt numerous variations and modifications of the method as applied to specific materials. The specific examples that follow are, similarly, only representative.

SPECIFIC EXAMPLES

TABLE II identifies the name, any trademark or trade name and the source (where significant) of the materials given in the specific examples; the description of the materials in the examples is, therefore, shortened accordingly.

TABLE II

| Material | Trademark | Source |
|---|---|---|
| Aluminum Type 3003, anodized, with or without seal. | | |
| Copper rolled electrical circuit grade | P-24 | Somers Brass Co. |
| Steel Type 1020 CR | | |
| Stainless Steel Type 304 | | |
| Nickel Alloy | Monel | International Nickel |
| Nickel Alloy | Inconel | International Nickel |
| Polytetraflouroethylene | Teflon | DuPont |
| Copolymer of Tetraflouroethylene and Hexaflouropropene | Teflon FEP | DuPont |
| Filled Teflon | Rulon | Dixon Corp. |
| Fiberglass cloth | | |
| Polyvinylflouride | Tedlar (50 SGTR, Type 40) | DuPont |
| Polyethylene film (medium density) | | |
| Polyethylene terephthalate | Mylar | DuPont |
| Polyimide film | Kapton | DuPont |
| Polyamide paper | Nomex | DuPont |
| Filled "Teflon" | Fluroloy C | Fluorocarbon Co. |
| Filled "Teflon" | Fluroloy S | Fluorocarbon Co. |

In the examples, the layers in the sandwich of materials wound on the roll are listed in order from outside in radially of the roll, it being understood, of course, that the sandwich is repeated layer by layer from near the core to the roll exterior. In the interest of brevity, the following abbreviations are used in the examples to designate the principal function or functions of each material in the composite roll:

| | |
|---|---|
| Primary Laminate Layer | L.L. |
| Bonding Material | B. |
| Pressure-distributing (interleaf) | P.D. |
| Cushioning strip (interleaf) | C.S. |
| Pressure-generating strip (interleaf) | P.G. |
| Release strip (interleaf) | R. |

In all of the examples the strips were wound onto a hollow minimum core having a six inch (6.00 inches) outside diameter and a 0.75 inch wall thickness. The strips were 2 feet wide.

EXAMPLE 1

| Material | Thickness (in mils) | Function |
|---|---|---|
| Al | 3 | R.* |
| Teflon (or filled Teflon, e.g., Tedlar | 5–30 | L.L. |
| Teflon FEP | 1–2 | B. |
| Al | 7–40 | L.L. |
| Fiberglass | 16 | C.S. |
| Steel | 2 | P.D. |

*Teflon tends to form a bond with steel but not with aluminum. The 2 mil steel is overwrapped on outside of roll to a thickness of 125 mil to form a confining member.
Heat to 630°F., hold for 1 hour.

EXAMPLE 2

| Material | Thickness (in mils) | Function |
|---|---|---|
| Al | 3 | R. |
| Teflon | 5–30 | L.L. |
| Teflon FEP | 1–2 | B. |
| Al | 7–40 | L.L. |
| Steel | 2 | P.D. |

Steel overwrapped to 125 mil.
Heat to 630°F., hold for 1 hour.

EXAMPLE 3

| Material | Thickness (in mils) | Function |
|---|---|---|
| Teflon | 5–30 | L.L. |
| Teflon FEP | 1–2 | B. |
| Al | 7–40 | L.L. |

Overwrapped with fiberglass tape to form a fairly loose, expandable hoop.
Heat to 630°F., hold for 1 hour.

EXAMPLE 4

| Material | Thickness (in mils) | Function |
|---|---|---|
| Polyethylene | 1.5 | C.S. & R. |
| Teflon | 5–30 | L.L. |
| Teflon FEP | 1–2 | L.L. & B. |

Overwrapped with fiberglass tape.

Heat to 630°F., hold for 1 hour.

EXAMPLE 5

| Material | Thickness (in mils) | Function |
|---|---|---|
| Teflon | 2-6 | R. & P.G. |
| Cu | 1,2,4, etc. oz.* | L.L. |
| Teflon FEP | 1-5 | B. |
| H-film or fiberglass cloth | 1-5 | L.L. |
| Teflon FEP | 1-2 | B. |
| Cu | 1-2 oz.* | L.L. |
| Steel | 2 | P.D. |

*weight per square foot
Overwrap with the steel, to 125 mil.
Heat to 540°F., hold for 1 hour. (at 540°F. Teflon does not fuse and will not bond with the steel.)

EXAMPLE 6

| Material | Thickness (in mils) | Function |
|---|---|---|
| Teflon | 2-6 | R. & P.G. |
| H-film or fiberglass cloth | 1-5 | L.L. |
| Teflon FEP | 1-2 | B. |
| Cu | 1-2 oz.* | L.L. |
| Steel | 2 | P.D. |

*weight, oz./ft.²
Steel overwrapped to 125 mils.
Heat to 540°F., hold for 1 hour.

EXAMPLE 7

| Material | Thickness (in mils) | Function |
|---|---|---|
| Cu | 1,2, 4 etc. oz.* | L.L. |
| Teflon FEP | 1-5 | B. |
| H-film or fiberglass cloth | 1-5 | L.L. |
| Teflon FEP | 1-2 | B. |
| Cu | 1-2 oz.* | L.L. |
| Steel | 2 | P.D. |

*weight, oz./ft.²
Steel overwrapped to 125 mils.
Heat to 540°F., hold for 1 hour.

EXAMPLE 8

| Material | Thickness (in mils) | Function |
|---|---|---|
| Cu | 1,2,4, etc. oz.* | L.L. |
| Teflon FEP | 1-5 | B. |
| H-film of fiberglass cloth | 1-5 | L.L. |
| Teflon FEP | 1-2 | B. |
| Cu | 1-2 oz.* | L.L. |

*weight, oz./ft.²
Lightly wrap roll with fiberglass tape.
Heat to 540°F., hold for 1 hour.

EXAMPLE 9

| Material | Thickness (in mils) | Function |
|---|---|---|
| Cu | 1,2,4, etc. oz.* | L.L. |
| Teflon FEP | 1-5 | B. |
| H-film | 1-5 | L.L. |

*weight, oz/ft.²
Lightly wrap roll with fiberglass tape.
Heat to 540°F., hold for 1 hour.

EXAMPLE 10

| Material | Thickness (in mils) | Function |
|---|---|---|
| Teflon | 2-6 | P.G. & R. |
| Teflon FEP | 1-2 | L.L. |
| A metal foil, e.g., titanium, brass, stainless steel, aluminum, Inconel, Monel | up to 40 | L.L. |
| Steel | 2 | P.D. |

Overwrap with the steel to 125 mil.
Heat to 540°F., and hold for 1 hour.

EXAMPLE 11

| Material | Thickness (in mils) | Function |
|---|---|---|
| Teflon | 2-5 | R. |
| Fiberglass cloth | 24 | L.L. |
| Teflon FEP | 60 | L.L. & B. |
| Teflon | 2 | R. |
| Steel | 2 | P.D. |

Wrap roll first with fiberglass cloth to 0.250 in. and then with 2 mil steel to 0.125 in.
Heat to 540°F., hold for 1 hour.

EXAMPLE 12

| Material | Thickness (in mils) | Function |
|---|---|---|
| Teflon | 2-5 | R. |
| Fiberglass cloth | 24 | L.L. |
| Teflon FEP | 2 | L.L. |
| Steel (mold release coated) | 2 | P.D. |

Overwrap as in Example 11.
Heat to 540°F., hold for 1 hour.

EXAMPLE 13

| Material | Thickness (in mils) | Function |
|---|---|---|
| Teflon | 2-5 | R. |
| Fiberglass cloth | 24 | L.L. |
| Teflon FEP | 2 | B. & .L.L. |
| Polyethylene | 2 | R. |
| Steel | 2 | P.D. |

Wrap first with 15 mil polyethylene to 0.25 in., then with 2 mil steel to 0.125 in.
Heat to 540°F., hold for 1 hour.

EXAMPLE 14

| Material | Thickness (in mils) | Function |
|---|---|---|
| Teflon FEP | 1-10 | B. & L.L. |
| Fiberglass cloth | 1-20 | L.L. |
| Teflon FEP | 1-10 | B. & L.L. |
| Steel (mold release coated) | 2 | P.D. |

Overwrap with the 2 mil steel to 0.125 in.
Heat to 540°F., hold for 1 hour.

EXAMPLE 15

| Material | Thickness (in mils) | Function |
|---|---|---|
| Cu, Al or Steel | Up to 40 | L.L. |
| H-film or Nomex coated both sides with 0.0003 inch min. epoxy | 1-5 | B. & L.L. |
| Cu, Al or Steel | Up to 40 | L.L. |

Wrap core first with capacitor paper to thickness of about 30 mils; then build roll.
Wrap roll with fiberglass tape.
Heat to 375°F., hold for 30 mins.

EXAMPLE 16

| Material | Thickness (in mils) | Function |
|---|---|---|
| Cu, Al or Steel | Up to 40 | L.L. |
| H-film or Nomex coated both sides with 0.0003 inch min. epoxy | 1-5 | B. & L.L. |
| Cu, Al or Steel | Up to 40 | L.L. |
| Steel | 2 | P.D. |

Wrap roll with the steel to 0.125 in.
Heat to 375°F., hold for 30 mins.

EXAMPLE 17

| Material | Thickness (in mils) | Function |
|---|---|---|
| Teflon or Tedlar | 2-5 | R. |
| Cu, Al or Steel | Up to 40 | L.L. |
| H-film or Nomex coated both sides with 0.003 inch min. epoxy | 1-5 | B. & L.L. |
| Cu, Al or Steel | Up to 40 | L.L. |
| Steel | 2 | P.D. |

Wrap roll with the steel to 0.125 in.
Heat to 375°F., hold for 30 mins.

EXAMPLE 18

| Material | Thickness (in mils) | Function |
|---|---|---|
| Teflon or Tedlar | 2-5 | R. |
| Cu, Al or Steel | Up to 40 | L.L. |
| "Mylar" or Nylon coated each side with 0.003 inch min. epoxy | 1-5 | L.L. |

| Material | Thickness (in mils) | Function |
|---|---|---|
| Cu, Al or Steel | Up to 40 | L.L. |
| Steel | 2 | P.D. |

Wrap roll with the steel to 0.125 in.
Heat to 320°F., hold for 30 mins.

EXAMPLE 19

| Material | Thickness (in mils) | Function |
|---|---|---|
| Teflon | 2–5 | L.L. |
| H-film or Nomex coated both sides with 0.003 inch min. epoxy | 1–5 | L.L. |
| Cu, Al, or Steel | Up to 40 | L.L. |
| Interleaf Steel | 2 | P.D. |

Wrap roll with the steel to 0.125 in.
Heat to 375°F., hold for 30 mins.

We claim:

1. A method of laminating at least two elongated strips of laminate material in which the bond between the strips is achieved by thermal activation of a thermally-activated polymeric bonding medium while the strips are urged toward each other under a substantial pressure comprising the steps of tightly winding the strips onto a core to form a roll, confining the exterior of the roll with a confining member to keep the roll from unwinding, heating the roll to a temperature sufficiently high to activate the bonding medium for a time sufficient to form a bond between the laminate material, and selecting the laminate materials, the material and construction of the core and the material and construction of the confining member so that the relative expansion of the materials of the roll while heated generates the said substantial pressure between the laminate materials.

2. A method according to claim 1 and further comprising the step of wrapping in tight and interleaved relation between successive layers of the laminate materials of the roll a pressure-distributing interleaf strip of a material of sufficient strength that it tends to isolate each layer of the laminate materials on the roll and control the distribution of the pressure generated between the laminate materials throughout the cross section of the roll.

3. A method according to claim 1 and further comprising the step of wrapping in tight and interleaved relation between successive layers of the laminate materials of the roll a pressure-generating interleaf strip of a material having a coefficient of thermal expansion sufficiently high to generate by thermal expansion upon heating of the roll a substantial pressure between the laminate materials.

4. A method according to claim 1 and further comprising the steps of wrapping in tight and interleaved relation between successive layers of the laminate materials of the roll a pressure-distributing interleaf strip of a material of sufficient strength that it tends to isolate each layer of the laminate materials on the roll and control the distribution of the pressure generated between the laminate materials throughout the cross section of the roll and wrapping in tight and interleaved relation between successive layers of the laminate materials of the roll a pressure-generating interleaf strip of a material having a coefficient of thermal expansion sufficiently high to generate by thermal expansion upon heating of the roll a substantial pressure between the laminate materials.

5. A method according to claim 1 and further comprising the step of wrapping in tight and interleaved relation between the successive layers of the laminate materials of the roll a cushion interleaf strip of a pressure-absorbing material having a compressibility under the temperature attained in the heating step of the method such that the said pressure between the laminate materials generated upon heating of the roll is substantially less than it would be during the heating step in the absence of the cushion interleaf strip.

6. A method according to claim 1 and further comprising the steps of wrapping in tight and interleaved relation between the successive layers of the laminate materials of the roll a cushion interleaf strip of a pressure-absorbing material having a compressibility under the temperature attained in the heating step of the method such that the said pressure between the laminate materials generated upon heating of the roll is substantially less than it would be during the heating step in the absence of the cushion strip and wrapping in tight and interleaved relation between successive layers of the laminate materials of the roll a pressure-distributing interleaf strip of a material of sufficient strength that it tends to isolate each layer of the laminate materials on the roll and control the distribution of the pressure generated between the laminate materials throughout the cross section of the roll.

7. A method according to claim 1 wherein the confining member is formed by multiple layers of a strip of material wrapped around the outer layer of the laminate materials of the roll.

8. A method according to claim 2 wherein the confining member is formed by making multiple wraps of the said pressure-distributing interleaf strip around the outer layer of the laminate materials of the roll.

9. A method according to claim 1 wherein the material selected for the core has a coefficient of thermal expansion substantially greater than the coefficient of thermal expansion of the material selected for the confining member so that said pressure is generated by an outward thermal expansion of the core that is greater than the thermal expansion of the confining member.

10. A method according to claim 1 wherein the roll is heated slowly from ambient temperature to provide a substantially uniform rate of temperature rise throughout the roll cross section.

* * * * *